United States Patent
Sakamoto et al.

(10) Patent No.: US 6,420,287 B1
(45) Date of Patent: Jul. 16, 2002

(54) CERAMIC ARTICLE

(75) Inventors: Akihiko Sakamoto, Shiga; Masanori Wada, Otsu, both of (JP)

(73) Assignee: Nippon Electric Glass Co., Ltd., Otsu (JP)

(*) Notice: Subject to any disclaimer, the term of this patent is extended or adjusted under 35 U.S.C. 154(b) by 0 days.

(21) Appl. No.: 09/600,675
(22) PCT Filed: Nov. 18, 1999
(86) PCT No.: PCT/JP99/06441
§ 371 (c)(1), (2), (4) Date: Jul. 20, 2000
(87) PCT Pub. No.: WO00/30997
PCT Pub. Date: Jun. 2, 2000

(30) Foreign Application Priority Data

Nov. 24, 1998 (JP) ............................................. 10-332292

(51) Int. Cl.[7] .......................... C03C 10/14; C03C 10/12
(52) U.S. Cl. ................................................. 501/4; 501/7
(58) Field of Search ....................................... 501/4; 1/7

(56) References Cited

U.S. PATENT DOCUMENTS

| | | | |
|---|---|---|---|
| 3,113,009 A | * | 12/1963 | Brown et al. |
| 3,252,811 A | * | 5/1966 | Beall |
| 3,585,390 A | | 6/1971 | Ishikawa |
| 3,625,718 A | * | 12/1971 | Petticrew |
| 3,677,785 A | * | 7/1972 | Horikawa et al. |
| 3,841,950 A | * | 10/1974 | Planchock et al. |
| 3,926,602 A | * | 12/1975 | Andrus et al. |
| 4,007,048 A | * | 2/1977 | Sack et al. |
| 4,009,042 A | * | 2/1977 | Rittler |
| 4,018,612 A | * | 4/1977 | Chyung |
| 4,057,434 A | * | 11/1977 | Rittler |
| 4,211,820 A | * | 7/1980 | Cantaloupe et al. |
| 4,629,593 A | | 12/1986 | Groh et al. |
| 4,835,121 A | * | 5/1989 | Shibuya et al. |
| 5,053,359 A | * | 10/1991 | Loxley et al. |
| 5,070,045 A | * | 12/1991 | Comte et al. |
| 5,173,453 A | * | 12/1992 | Beall et al. |
| 5,179,045 A | * | 1/1993 | Aitken et al. |
| 5,256,600 A | * | 10/1993 | Pfitzenmaier |
| 5,446,008 A | * | 8/1995 | Krolla et al. |
| 5,512,520 A | * | 4/1996 | Pfitzenmaier |
| 5,776,613 A | * | 7/1998 | Shimatani et al. |

FOREIGN PATENT DOCUMENTS

| | | |
|---|---|---|
| DE | 34 47 633 | 7/1985 |
| EP | 0 577 427 | 6/1997 |
| WO | WO 91/10891 | 7/1991 |

* cited by examiner

Primary Examiner—Tom Dunn
Assistant Examiner—Colleen P. Cooke
(74) Attorney, Agent, or Firm—Collard & Roe, P.C.

(57) ABSTRACT

In order to provide a tubular or a rod-like ceramic article which is opaque to a visible light and which enables easy and efficient measurement and inspection of its internal structure, the tubular or the rod-like ceramic article opaque to a visible light is made of an infrared transmitting ceramics having a transmittance not less than 45% for an infrared ray having a wavelength of 1500 nm and incident from the air when the thickness is equal to 1 mm. Preferably, the ceramic article is made of an infrared transmitting ceramics which satisfies the condition given by $(1-R)^2 \geq 0.84$ and $\mu \leq 0.7/mm$ where R represents a reflectance at 1550 nm and $\mu$ represents a sum of scattering coefficient and an absorption coefficient.

3 Claims, 1 Drawing Sheet

CERAMIC ARTICLE

TECHNICAL FIELD

This invention relates to a tubular or a rod-like ceramic article.

BACKGROUND ART

Ceramic materials are widely used in various industries. In particular, a large number of tubular or rod-like ceramic components having a precision shape, including a precision capillary tube having a minute bore are commercially produced as, for example, a fixing member, a guiding member, an aligning member, a reinforcing member, a coating member, a connecting member, or the like for an optical component or an electronic component. In the production of such precision components, it is a serious problem to accurately measure inside dimensions such as the size of the bores and to detect internal defects such as bubbles and cracks.

If the materials were transparent to a visible light, measurement of the inside dimensions and detection of the defects could easily be carried out by use of optical measuring instruments. However, since the ceramic material is opaque to the visible light in general, it is impossible to use the above mentioned approach.

Under the circumstances, various kinds of precision gauges are inevitably used for measurement of the dimensional accuracy. In this event, there arise problems that it takes a lot of time and labor and/or that it is impossible to measure an inner area to which no gauge is accessible. The detection of the internal defects is often carried out by a technique using an ultrasonic wave or a technique using a radioactive ray. However, each of these techniques is disadvantageous in that a measuring device is complicated and that test efficiency is low.

It is therefore an object of this invention to provide a tubular or a rod-like ceramic article which is opaque to the visible light and which is easy and efficient in measurement and inspection of its internal structure.

DISCLOSURE OF THE INVENTION

As a result of accumulation of diligent studies for the purpose of solving the above-described problems, the present inventors have found out that some of ceramic materials are transparent to an infrared ray although opaque to a visible light and that tubular articles or rod-like articles made of such infrared-transparent ceramic materials are easy in measurement and inspection of their internal structures by the use of the infrared ray, and hereby propose this invention.

A ceramic article according to this invention is a tubular or a rod-like ceramic article opaque to a visible light, and is characterized in that it is made of an infrared-transparent ceramic material having a transmittance not, in its thickness of 1 mm, less than 45%, preferably not less than 60%, for an infrared ray having a wavelength of 1550 nm and incident from the air.

In this invention, "opaque to the visible light" means that the measurement and the inspection of the internal structure by the use of the visible light are difficult and, more specifically, that the average transmittance for a direct-advancing light in the visible range (380–760 nm) is not greater than 50% when the thickness is equal to 1 mm.

BEST MODE FOR EMBODYING THE INVENTION

Figure 1:
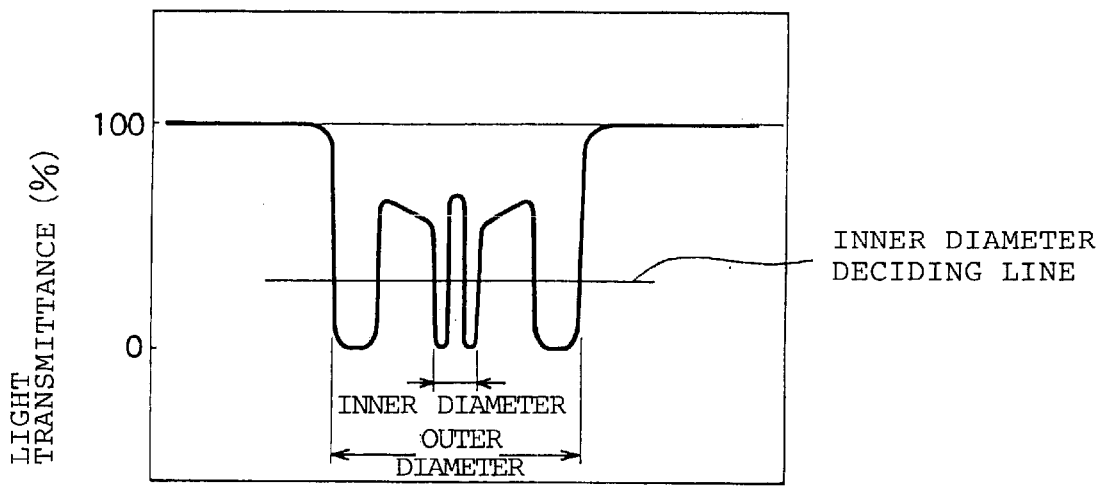
FIG. 1 is an explanatory view showing the distribution of a section transmittance of a capillary sample which is capable of measurement of its bore.

First, this invention will be described more in detail.

A ceramic article of this invention is made of an infrared-transparent ceramics opaque to a visible light. The infrared-transparent ceramics has an infrared transmittance not less than 45% for the wavelength of 1550 nm when it has a thickness equal to 1 mm. The reason why the infrared transmittance for the wavelength of 1550 nm is considered will be described.

In order to use the infrared ray for the measurement and the inspection, light emitting and light receiving elements of an infrared laser are required. Those elements presently available have wavelengths of 790 nm, 1310 nm, 1550 nm, and so on.

Generally, as the wavelength is longer, the resolution of measurement becomes lower so that the measurement accuracy is decreased. However, the longer wavelength is advantageous for transmission of the light through the ceramics.

According to the studies of the present inventors, it has been revealed that, if the light emitting and the receiving elements of the wavelength of 1550 nm are used, a sufficient amount of transmitting light energy required for measurement is readily obtained while the measurement accuracy on the order of submicrons is assured. If the infrared transmittance for 1550 nm is not less than 45% when the thickness is equal to 1 mm, it is possible to carry out the measurement and the inspection with high accuracy by the use of the infrared ray having the above-mentioned wavelength.

It is not always necessary to use. the infrared ray of 1550 nm in case where the article of this invention is measured or inspected. This is because the use of the infrared ray having a different wavelength may be advantageous over the use of the infrared ray of 1550 nm depending on a required accuracy in measurement or inspection or infrared transparent characteristics of the ceramics.

Preferably, the ceramic article of this invention satisfies the condition given by $(1-R)^2 \geq 0.84$ and $\mu \leq 0.7/mm$ where R represents a reflectance at 1550 nm and $\mu$ represents a sum of a scattering coefficient and an absorption coefficient. The reason will be described in the following.

The relationship of the transmittance T and the thickness L is represented by the equation: $T = A \exp(-\mu L)$.

The constant A is replaced by $(1-R)^2$. As understood from this equation, the transmittance is determined by the constant A and $\mu$, where the thickness L of the material is constant.

For example, there are an infinite number of combinations of A and $\mu$ such that the transmittance T is not less than 45% when the thickness L is equal to 1 mm. However, in case where A is smaller than 0.84 or in case where $\mu$ is greater than 0.7/mm, the decrease in transmittance is remarkable when the thickness L is large. Therefore, the article made of such material is limited in thickness to a small value within a range allowing the measurement and the inspection by the infrared ray of 1550 nm, and is not practical.

Specifically, the above-mentioned infrared-transparent ceramics is not limited to ceramics in a narrow sense (alumina, zirconia, and so on) but includes ceramics in a broad sense including glass (milky glass, colored glass, and so on) and glass ceramics. The infrared transmittance of these materials can be adjusted in various manners.

For example, in the narrow-sense ceramic or the glass ceramic and in the milky glass, the infrared transmittance can be adjusted by controlling the particle size of precipitated crystals or the difference in refractive index from a matrix phase and by controlling the particle size of heterogeneous particles produced by phase separation or the difference in refractive index among difference phases, respectively.

Description will be made about the method of producing each material.

In case of the ceramics in a narrow sense, the material such as zirconia having a crystal system belonging to a tetragonal system or the material such as alumina having crystals belonging to a hexagonal system but having a small birefringence is molded at 1300 to 1800° C. by a hot-pressing technique and sintered with bubbles decreased to a possibly least amount.

In case of the glass ceramic material, use may be made of, for example, a material obtained by preparing the glass containing, by weight percent, 60–75% $SiO_2$, 15–28% $Al_2O_3$, 1.8–5% $Li_2O$, 0–10% $K_2O$, 1.5–5% $TiO_2$, and 0–4% $ZrO_2$ and heat-treating and crystallizing the glass in a range of 800 to 1100° C. to precipitate β-quartz solid solution, β-spodumene solid solution, and so on. Use may also be made of a material obtained by preparing the glass containing 50–80% $SiO_2$, 8–13% $Li_2O$, 1–4% $P_2O_5$, 1–11% $Al_2O_3$, 0–7% ZnO, and 0–6% $K_2O$ and crystallizing the glass at 800 to 1100° C. to precipitate lithium silicate, quartz, cristobalite, and so on. In most cases, the crystal phase and the glass phase coexist in these glass ceramics. In order to reduce the difference in refractive index between the crystal phase and the matrix phase, a metal element or a semiconductor element may be added to the glass as an additive. It is thus possible to improve the infrared transmittance. Herein, it is not necessary to consider the existence ratio between the crystal phase and the glass phase.

In case of the glass material, use may be made of, for example, a phase-separation milky glass containing, by weight percent, 60–70% $SiO_2$, 3–14% $Al_2O_3$, 1–4% $B_2O_3$, 1–3% BaO, 0–5% ZnO, and 10–22% $Na_2O$.

In any event, in order to obtain an excellent infrared-transparent characteristic, it is desired that the precipitated crystal and the heterogeneous particle have particle sizes not greater than 3 μm. It is also desired that the difference in refractive index is as small as possible.

In case of the glass or the glass ceramics, it is possible to adjust the infrared transmittance by controlling the content of coloring ions having light absorptivity in the infrared region.

In case where the ceramic article of this invention is used for precision components such as electronic components, it is preferable to use, as the infrared-transparent ceramics, the ceramics in a narrow sense containing zirconia, alumina, or the like as precipitated crystals or the glass ceramics containing β-quartz solid solution, β-spodumene solid solution, lithium silicate or the like as precipitated crystals. These materials are excellent in mechanical, thermal, and chemical characteristics and are therefore suitable for the precision components.

Description will now be made about specific examples of production of the ceramic article of this invention.

Table 1 shows examples (Samples Nos. 1–5) of this invention and Table 2 shows comparative examples (Samples Nos. 6 & 7).

At first, opaque ceramic materials shown in Tables 1 and 2 were prepared and processed into a cylindrical shape having a diameter of 2.5 mm and a length of 10 mm. Thereafter, a bore having a diameter of 0.1 mm was formed by ultrasonic machining to provide a capillary sample.

The ceramic material used in producing each of the samples Nos. 1, 2, and 6 is an $Li_2O$—$Al_2O_3$—$SiO_2$ glass ceramic which was obtained by heat-treating an $Li_2O$—$Al_2O_3$—$SiO_2$ glass at 950° C. for two hours, at 1000° C. for one hour, and at 120° C. for two hours to crystallize the glass.

The ceramic material used in the sample No. 3 is a milky glass comprising an $Na_2O$—$Al_2O_3$—$SiO_2$ glass which was obtained by melting raw materials at 1550° C., slowly cooling to cause phase separation of the glass so that the heterogeneous particles were produced.

The ceramic material used in each of the samples Nos. 4, 5, and 7 is alumina ceramics or zirconia ceramics which was obtained by kneading raw materials with a binder added thereto and thereafter sintering by the hot-pressing technique.

The infrared transmittance in Tables 1 and 2 was obtained by irradiating a laser beam having a wavelength of 1550 nm to the samples and measuring the amount of transmitting light energy of the direct-advancing light.

The average transmittance for the visible light was obtained by irradiating the visible light of 380 to 760 nm and measuring the amount of transmitting light energy of the direct-advancing light by the use of a spectrophotometer. The constant A was obtained by measuring the refractive index of the sample and calculating the following equation. Herein, $n_1$ represents the refractive index of the air and $n_2$ represents the refractive index of the sample.

$$R=\{(n_1-n_2)/(n_1+n_2)\}^2$$

$$A=(1-R)^2$$

The constant a was calculated by the following equation, using the infrared transmittance T, the constant A, and the thickness L of the sample.

$$\mu=ln(A/T)/L$$

The particle size of the precipitated crystal or the heterogeneous particle was measured by the use of a scanning electron microscope.

Next, each sample was evaluated for the possibility of measurement of the bore by the infrared ray. The evaluation was carried out by making an infrared laser beam of 1550 nm scan the sample in a diametric direction and measuring the transmittance distribution corresponding to positions in the diametrical direction of the sample.

Figure 2:
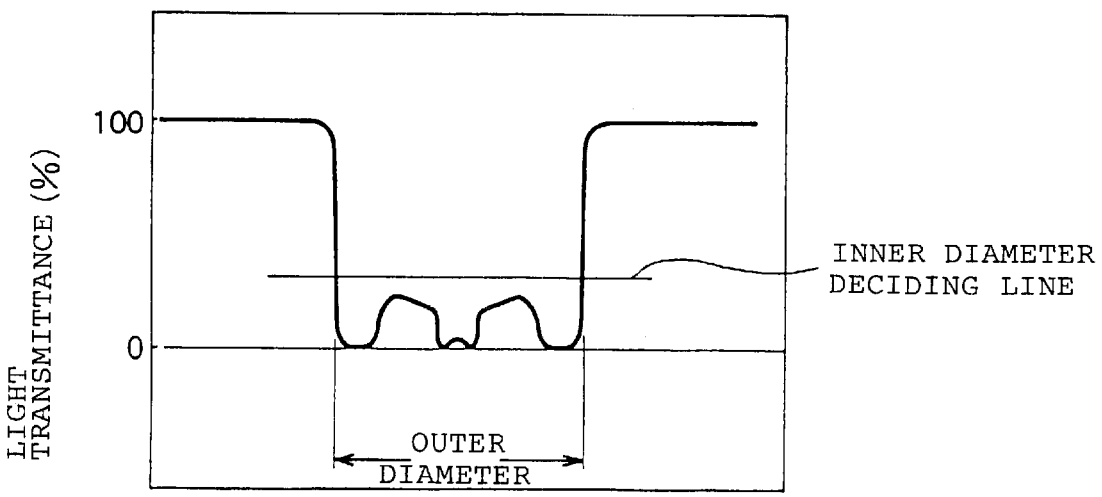
FIG. 2 is an explanatory view showing the distribution of a section transmittance of a capillary sample which is impossible in the measurement of its bore.

In the infrared transmittance distribution, the sample is marked "○" if the inner diameter portion was clearly identified as shown in FIG. 1 while the sample is marked "x" if the inner diameter portion is difficult to be identified as shown in FIG. 2.

As a result, each of the samples prepared by the use of the ceramic material having a high infrared transmittance as the examples of this invention allowed the measurement of its internal cavity by the infrared ray. On the other hand, in each of the samples prepared by the use of the material having a low infrared transmittance as the comparative examples, measurement of the bore was impossible.

From the above-mentioned facts, it is shown that the ceramic article according to this invention allows the measurement and the inspection of its internal structure by the infrared ray of 1550 nm.

TABLE 1

| | The Invention | | | |
|---|---|---|---|---|
| Sample No. | 1 | 2 | 3 | 4 |
| infrared transmittance (%) [1500 nm, 1 mm thick] | 71 | 87 | 82 | 50 |
| average transmittance for visible light (%) [380–760 nm, 1 mm thick] | 10 | 12 | 32 | 5 |
| A $(=(1-R)^2)$ [1550 nm] | 0.92 | 0.92 | 0.91 | 0.86 |
| $\mu$ (/mm) [1550 nm] | 0.25 | 0.06 | 0.10 | 0.55 |
| precipitated crystals or heterogeneous particles | β-quartz solid solution | β spodumene solid solution | phase separation | alumina |
| particle size (μm) | 0.8 | 0.3 | 0.1 | 2.0 |
| possibility of measurement of internal cavity | ○ | ○ | ○ | ○ |

TABLE 2

| | The Invention | Comparative Example | |
|---|---|---|---|
| Sample No. | 5 | 6 | 7 |
| infrared transmittance (%) [1500 nm, 1 mm thick] | 56 | 42 | 36 |
| average transmittance for visible light (%) [400–700 nm, 1 mm thick] | 10 | 5 | 0 |
| A $\{=(1-R)^2\}$ [1550 nm] | 0.88 | 0.88 | 0.82 |
| $\mu$ (/mm) [1550 nm] | 0.45 | 0.75 | 0.82 |
| precipitated crystals or heterogeneous particles | zirconia | β spodumene solid solution | alumina |
| particle size (μm) | 0.1 | 2.5 | 3.8 |
| possibility of measurement of internal cavity | ○ | X | X |

Industrial Applicability

As described above, in the ceramic article of this invention, it is possible to measure the inside dimension and to inspect the internal defect such as bubbles and cracks by the optical approach. Therefore, the ceramic article is suitable for precision components required to be free from defects and to have a high dimensional accuracy, for example, a fixing member, a guiding member, an aligning member, a reinforcing member, a coating member, and a connecting member for optical and electronic components or an optical component itself.

What is claimed is:

1. A tubular ceramic article opaque to a visible light, said article being made of infrared transmitting ceramics having a transmittance, in its thickness of 1 mm, not less than 45% for an infrared ray having a wavelength of 1550 nm and incident from the air, wherein the infrared transmitting ceramics satisfy the condition given by $(1-R)^2 \geq 0.84$ and $\mu \leq 0.7$/mm where R represents a reflectance at 1550 nm and $\mu$ represents a sum of a scattering coefficient and an absorption coefficient.

2. A ceramic article as claimed in claim 1, wherein said infrared transmitting ceramics consist essentially of a matrix phase and one of a precipitated crystal and a heterogeneous particle coexisting with said matrix phase, both of said precipitated crystal and said heterogeneous particle having a particle size not greater than 3 μm.

3. A ceramic article as claimed in claim 1, wherein said infrared transmitting ceramics consist essentially of a ceramic material with zirconia or alumina contained as precipitated crystals or a glass ceramic with at least one of μ-quartz solid solution, β-spodumene solid solution, and lithium silicate contained as precipitated crystals.

* * * * *